Nov. 14, 1961  P. N. CURRY  3,008,451
ANIMAL DRINKING VALVE
Filed April 22, 1959
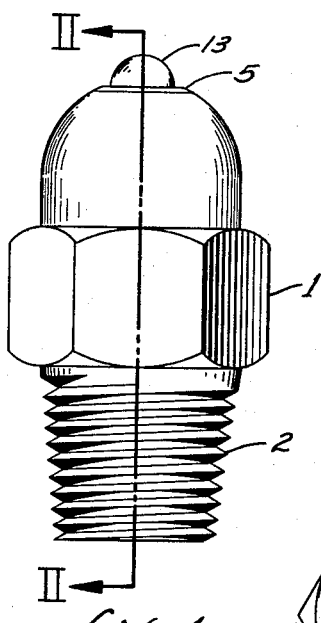
fig. 1
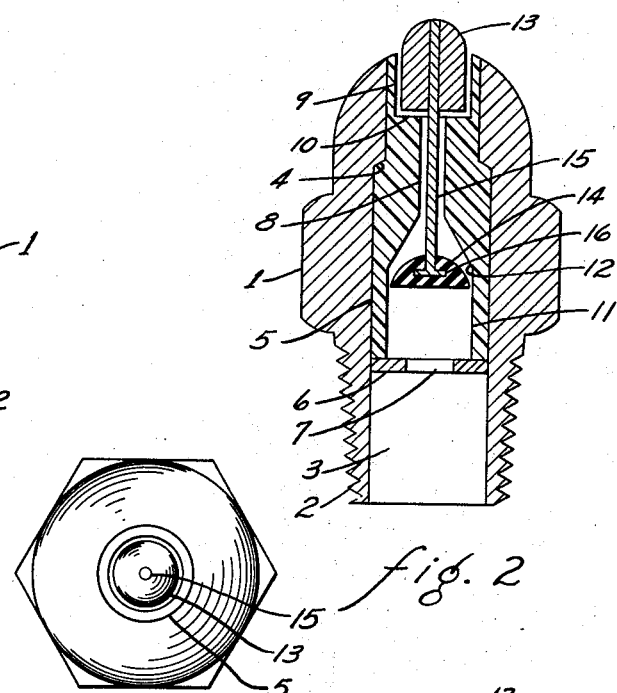
fig. 2
fig. 3
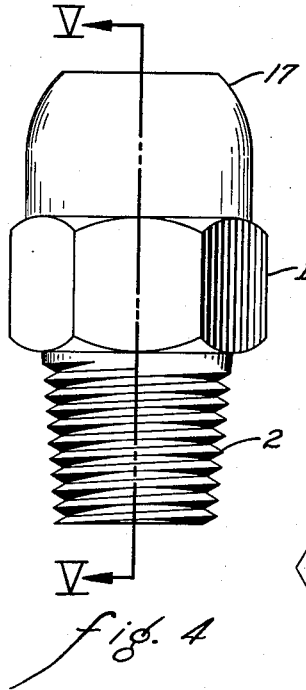
fig. 4
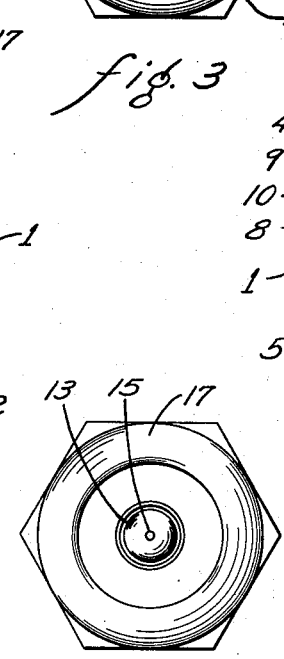
fig. 5
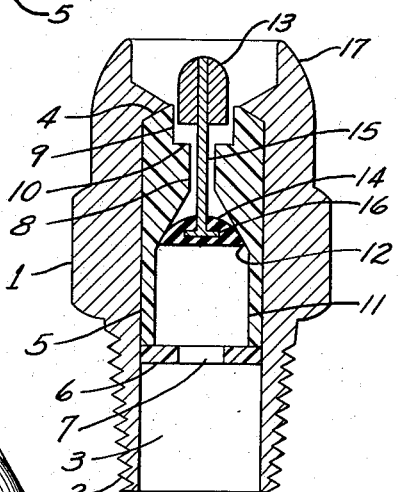
fig. 6
INVENTOR.
PAUL N. CURRY
BY
Attnys.

3,008,451
ANIMAL DRINKING VALVE
Paul N. Curry, Kalamazoo, Mich., assignor to The Upjohn Company, Kalamazoo, Mich., a corporation of Delaware
Filed Apr. 22, 1959, Ser. No. 808,065
9 Claims. (Cl. 119—72.5)

This invention relates to an animal drinking valve, more particularly to a non-leaking, low water pressure, animal activated drinking valve.

It is well known in the art that animal activated drinking valves which operate in a low water pressure system are prone to leakage because of the low pressures employed to seat the valve in a closed position. The low pressures are inherently necessary so as to provide a system of sufficiently low resistance that the valve can be opened by small animals, e.g., rodents and poultry, by manipulating a contact member with some portion of their head, e.g., by licking or pecking, and which does not produce a flow of water greater than can be consumed by the animal. It is also well known that water leaking from these valves can produce unsanitary conditions, a most undesirable situation in the scientific or commercial raising of small animals, as well as being wasteful of water or depleting the water reservoir.

It is an object of this invention to provide a trouble-free, low water pressure, animal activated drinking valve. Another object is to provide such a valve which does not tend to leak after long use. Another object is to provide such a valve which is readily adaptable for use with all types of small animals capable of self watering. Another object is to provide such a valve which is economical and simple in construction. Other objects will be apparent to those skilled in the art to which this invention pertains.

The objects of this invention are met by a valve of the general construction as described and claimed herein which has a plastic surfaced valve seat, preferably also a plastic surfaced valve bore, and a supple elastomeric valve head. The plastic surface on the valve seat inhibits the deposition of salts from the water, probably in part due to the lack of electrolytic action at the valve seat because of the non-metallic surface, thereby markedly reducing the likelihood of the valve leaking after being used for some time. Also, a plastic surfaced valve bore, by eliminating metal to metal contact of moving parts, reduces the friction coefficient of the valve and inhibits mineral deposition on any of the moving parts, thereby markedly reducing the likelihood of leakage due to the valve sticking in a partially open position. Moreover, when a plastic having a greasy-like texture is employed, e.g., Teflon or polyethylene, there is less of a tendency for any mineral particles to adhere to the surface thereof and those that do are readily removed by the operation of the valve. The supple nature of the elastomeric valve head eliminates the necessity of a carefully machined valve seat because the valve head molds itself around any minor surface imperfections or small amounts of material which may collect on the valve seat. Moreover, the flexible nature of the valve head produces a windshield-wiper effect which tends to remove any particles which are deposited on the valve seat. The supple nature of the valve head in itself contributes materially to the non-leaking characteristics of the valves as described herein. However, when used in combination with a plastic surfaced valve seat, and preferably a plastic surfaced valve bore, the likelihood of a valve leaking after being used is reduced even more, the plastic and elastomer working cooperatively to produce this highly desirable result.

When used herein, supple means yielding under very low water pressures, viz., the water pressures employed in the animal watering systems described herein, e.g., water pressures of as low as a one-inch column of water. Natural gum and latex rubbers, the low molecular weight synthetic butyl and vinyl rubbers and mixtures thereof including the closed cell, non-absorbent rubbers, that can be squeezed and flexed between the fingers with minimal force, e.g., having a durometer reading of from 0.05 to 30, are examples of supple elastomers. A plastic surfaced valve seat means a valve seat whose surface is a non-metallic, solid polymer. As is apparent, the plastic must be substantially unaffected by water, as are most commercially available thermoplastic and thermosetting plastics, e.g., polyethylene, polystyrene, polyacrylates, polyvinyls, polyamides, halogenated polyalkanes, phenolformaldehyde resins (Bakelite), etc. The natural and synthetic rubbers having the desired characteristics are also polymers within the term plastic as used herein.

The valve seat can be plastic surfaced by coating the internal surfaces of a metal valve of the desired shape with a plastic, e.g., polyethylene, nylon or polystyrene. However, as shown in the drawing, the preferred embodiment of this invention employs a hollow metal valve body with a swage fitted plastic liner shaped to produce a plastic surfaced valve bore, including valve seat. Polytetrafluoroethylene (Teflon) is desirable for this purpose because of its low metal to Teflon friction coefficient and its dimensional stability, i.e., freedom from shrinking and warping in use, e.g., due to chemical or temperature changes. Thus, a Teflon lined valve can be repeatedly sterilized, an important factor in preventing the transmission of infectious diseases in animal colonies. Moreover, because Teflon is free from plasticizers, solvents and fillers, there is no possibility of water pollution therefrom, an important factor in scientifically controlled animal studies.

Valves of the designs shown in the drawing can be employed in rodent and monkey cages, permitting the use of a completely automatic self-watering system, replacing the well known and laborious bottle and tube system ordinarily used with rodent cages.

A preferred valve comprises a valve body having a plastic surfaced valve bore enlarged at each end and a valve plunger, comprising an animal contact member loosely fitted in and protruding from the enlarged external end of the valve bore, a supple elastomeric valve head loosely fitted in the enlarged internal end of the valve bore, and a valve stem loosely fitted in the median portions of the valve bore and connecting the animal contact member with the valve head, the internal end of the valve bore being shaped to form a valve seat for the valve head, the valve being opened by the animal forcing the valve plunger inwardly into the valve body by manipulating the animal contact member with its head, e.g., by licking or pecking, and being closed by the animal releasing the valve plunger. The term loosely fitted means having a diameter sufficiently less than the diameter of the enlarged internal end of the valve bore so as to permit water to flow around the valve head when the valve is in open position.

Especially preferred are valves as described above in which the total valve bore surface, including valve seat, is plastic, preferably polytetrafluoroethylene (Teflon), thereby eliminating any metal to metal contact and thus materially reducing friction. Thus, a valve as shown in the drawing employing Teflon as the valve bore and seat can be operated with so little water pressure that 0.01 ounce force on the animal contact member will open valve and yet the valve will close repeatedly without leaking.

Also preferred are valves as described hereinbefore in which the diameter of the valve head is only slightly less, e.g., from about 0.002 to about 0.006 of an inch, than the diameter of the enlarged internal bore of the valve, at least at the area between the valve seat and the point reached by the valve head when the valve is in a completely open position. With a valve of this construction, when the animal contact member is released, a small head of water, e.g., 8 to 10 inches of water, will produce a hydraulic ram effect, thus quickly and firmly seating the valve head. Employing a valve of this construction will thus provide even greater assurance that the valve will repeatedly close completely.

Referring to the accompanying drawing, which illustrates preferred embodiments of the invention, FIGS. 1 and 4 are perspective views of valves made in accordance with this invention and adapted for rodent use, shown in approximately 4× full size;

FIGS. 3 and 6 are top view perspectives of the valves shown in FIGS. 1 and 4, respectively;

FIG. 2 is a longitudinal section on the line II—II of the valve shown in FIG. 1; and FIG. 5 is a longitudinal section on the line V—V of the valve shown in FIG. 6.

Referring to FIGS. 2 and 5, the valve body 1, preferably metal for durability, e.g., bronze, aluminum, stainless steel, or brass, is shown threaded 2 for connection to the water supply, e.g., in the manner described in U.S. 2,486,729. The valve body has a cylindrical axial passage 3 constricted at 4 near its external end. A plastic liner is swage fitted into the axial passage, being longitudinally positioned by the constriction at 4. The plastic liner is optionally forced into the axial passage 3 with the aid of a disc 6 having a hole 7 to permit the passage of water therethrough. The disc can be made of metal as shown in FIG. 2 or plastic as shown in FIG. 5. The plastic liner 5 is hollow to form the cylindrical valve bore 8. The bore 8 formed by the hollow plastic liner 5 is enlarged at the external end 9 and enlarged at the internal end 11 to form a frustro-conical plastic surfaced valve seat 12. The valve plunger consists of an animal contact element 13, preferably metal for durability, e.g., bronze, magnesium, aluminum, stainless steel, or brass, loosely fitted in the enlarged external end 9 of the valve bore, a supple elastomeric valve head 14, preferably gum rubber, loosely fitted in and preferably having a diameter of about 0.002 to about 0.006, desirably about 0.003, inch less than the diameter of the enlarged internal end 11 of the valve bore, and a valve stem 15, which is preferably metal for rigidity, loosely fitted in the medial portion of the valve bore 8, and connecting the animal contact element 13 with the valve head 14. The valve stem 15 is of sufficient length so that when the animal contact member 13 is forced inwardly or at an angle, the valve head 14 is unseated a sufficient distance to permit water to flow freely around the valve head, before the animal contact member 13 reaches the bottom 10 of the enlarged external end 9 of the valve bore 8, thereby permitting water to also flow around the animal contact member. The valve head 14 is held to the valve stem 15 by a head 16 on the valve stem. In manufacture, the valve head can be molded on to head of the valve stem, thereby ensuring a permanent bond between the valve head and valve stem. FIG. 5 shows a valve body shaped to form a guard 17 around the animal contact element 15.

In operation, the valve is normally closed, as shown in FIG. 5, with the valve head 14 seated against the valve seat 12 by water pressure and, if the valve is in an inverted position, by the weight of the animal contact element 13, the valve head 14 and valve stem 15, thereby preventing the passage of water past the valve head. The valve is opened, as shown in FIG. 2, by an animal forcing the animal contact member 13 inwardly, either straight or at an angle, into the externally enlarged end 9 of the valve bore 8. The inward motion of the animal contact member forces the valve stem 15 inwardly, thus unseating the valve head 14 and thereby permitting water to flow around the valve head 14, valve stem 15 and animal contact member 13. The guard 17 shown in FIG. 5 prevents the valve from being opened accidently by the animal brushing against the animal contact member 13 with its body and also prevents the animal contact member 13 from being chewed, thereby prolonging the life of the valve. Also, when the valve is operated in horizontal or upright vertical position, a drop of water will collect in the cup-like area of the guard 17, thus assisting in teaching the animal to use the valve.

The animal contact member 13 can be adapted in shape and size so that the valve is useful for rodents, poultry, or other animals. The nipple design shown in the drawing is useful for rats, mice, and monkeys whereas a highly polished metal ball is somewhat more attractive to poultry. The relationship of the enlarged external end 9 of the valve bore 8 and the animal contact member 13 can be adjusted so that the released water flows down the contact member and, if desired retaining a drop thereon, an advantage in poultry watering. The annular space between the animal contact member and the enlarged external end of the valve bore can be increased to prevent clogging in poultry feeding.

The rate of water flow when the valve is opened can be controlled by the water pressure and/or the amount of space between the valve stem 15 and the valve bore 8 and between the valve head 14 and the enlarged internal end 11 of the valve bore 8. As only a few inches or less of water pressure is normally employed, the latter method of water flow control is normally used.

It is obvious that variations and modifications can be made in the valves as described herein without departing from the invention as claimed hereinafter.

I claim:

1. An animal activated, low water pressure drinking valve comprising a valve body provided with a plastic surfaced valve bore enlarged at each end and a valve plunger comprising an animal contact member loosely fitted in and protruding from the enlarged external end of said valve bore, a supple elastomeric valve head loosely fitted in the enlarged internal end of said valve bore, and a valve stem loosely fitted in the median portion of said valve bore and connecting said animal contact member with said valve head, said internal end of said valve bore being shaped to form a valve seat for said valve head.

2. A valve as claimed in claim 1 wherein the valve bore is surfaced with polytetrafluoroethylene.

3. A valve as claimed in claim 1 wherein said valve head is hemispherical and said valve seat is frusto-conical.

4. An animal activated, low water pressure drinking valve comprising a metal valve body with a swage fitted hollow plastic liner forming a cylindrical valve bore, said bore being enlarged at the internal end thereof so as to form a frusto-convex valve seat and being enlarged at the external end thereof; and a valve plunger comprising an animal activated, cylindrical metal contact member loosely fitted in and protruding from the enlarged external end of said valve bore, a supple elastomeric hemispheroidal valve head loosely fitted in the enlarged internal end of said valve bore, and a valve stem loosely fitted in the medial position of said valve bore and connecting said valve head with said animal contact member, said valve head being unseated and said valve being opened by the animal applying force directly to said contact member whereby said contact member is forced inwardly into said valve body.

5. A valve as claimed in claim 4 having a guard around said contact member, formed from said valve body and of a height slightly greater than the exposed portion of said contact member.

6. A valve as claimed in claim 4 wherein said plastic liner is polytetrafluoroethylene and said valve head is gum rubber.

7. A valve as claimed in claim 4 wherein said valve head has a diameter from about 0.002 to about 0.006 inch less than the diameter of said enlarged internal end of said valve bore.

8. A valve as claimed in claim 4 wherein said valve head has a diameter about 0.003 inch less than the diameter of said enlarged internal end of said valve bore.

9. An animal activated, low water pressure drinking valve comprising a valve body provided with a plastic surfaced valve bore and a valve plunger comprising an animal contact member loosely fitted in and protruding from the external end of said valve bore, a supple elastomeric valve head loosely fitted in the internal end of said valve bore, and a valve stem loosely fitted in the median portion of said valve bore and connecting said animal contact member with said valve head, said internal end of said valve bore being shaped to form a valve seat for said valve head.

References Cited in the file of this patent

UNITED STATES PATENTS

| | | |
|---|---|---|
| 2,307,220 | Hewitt | Jan. 5, 1943 |
| 2,710,594 | Thompson | June 14, 1955 |
| 2,845,046 | Hart | July 29, 1958 |

UNITED STATES PATENT OFFICE
CERTIFICATE OF CORRECTION

Patent No. 3,008,451                         November 14, 1961

Paul N. Curry

It is hereby certified that error appears in the above numbered patent requiring correction and that the said Letters Patent should read as corrected below.

Column 2, line 6, for "non-absorbent rubbers" read -- non-absorbent sponge rubbers --.

Signed and sealed this 10th day of April 1962.

(SEAL)
Attest:

ERNEST W. SWIDER                       DAVID L. LADD

Attesting Officer                          Commissioner of Patents